May 26, 1942.   H. WEICHSEL   2,284,114
ELECTRICAL CIRCUIT INTERRUPTING MEANS
Filed June 19, 1939
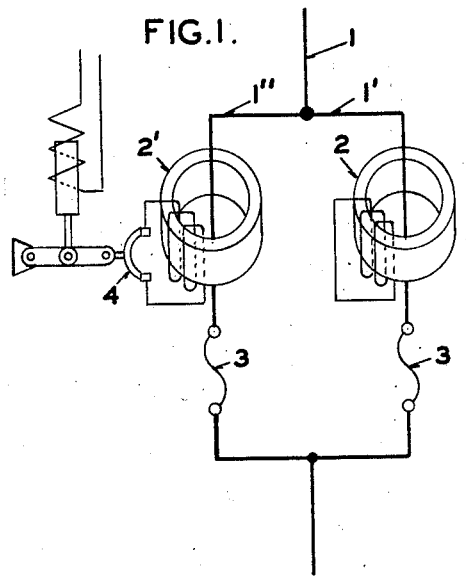
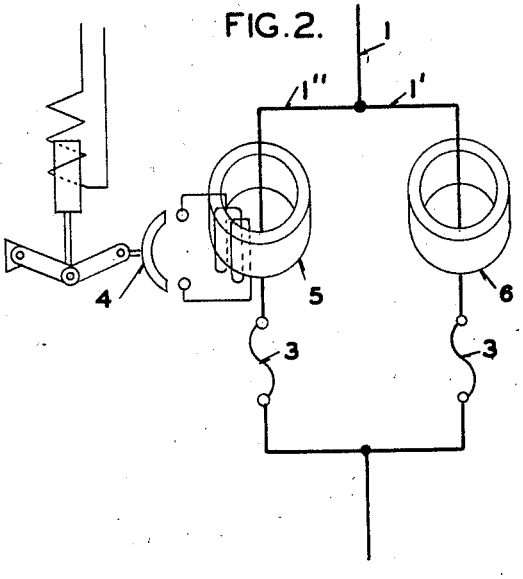
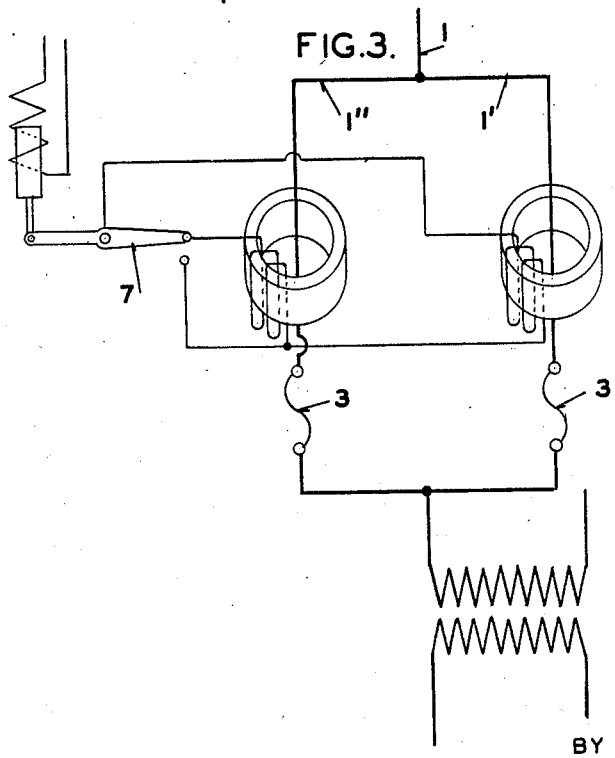
INVENTOR
HANS WEICHSEL
BY
*E. E. Huffman*
ATTORNEY Patented May 26, 1942

2,284,114

UNITED STATES PATENT OFFICE 2,284,114

ELECTRICAL CIRCUIT INTERRUPTING MEANS

Hans Weichsel, Webster Groves, Mo., assignor to Wagner Electric Corporation, St. Louis, Mo., a corporation of Delaware Application June 19, 1939, Serial No. 279,862

2 Claims. (Cl. 175—294)

My invention relates to means capable of being employed in lieu of a switch for opening electric circuits which carry high amperage current, the object of the invention being to provide interrupting means for circuits carrying such currents which will be much smaller and less expensive than a switch of requisite size for the purposes.

My invention is applicable to various uses, among which are the interruption of secondary circuits of a transformer in response to abnormal temperature conditions which might be injurious, or in response to fault conditions in low voltage alternating current network distribution systems under which it becomes necessary to disconnect the supplying transformers from the network.

In the accompanying drawing, Figure 1 illustrates a portion of an electrical load carrying circuit having my improved circuit interrupting means embodied therein; and Figures 2 and 3 illustrate modifications.

Referring to Figure 1, the load circuit 1 comprises two branches 1' and 1" connected in parallel, each provided with an impedance such as series transformers 2 and 2', and with fuses 3. The fuses should be of approximately the same capacity and the impedance of the branches 1' and 1" should be substantially equal when the secondaries of the series transformer circuits are closed. Thus, under normal conditions, each fuse will carry one-half of the load current. In Figure 1 a solenoid-operated switch 4 is provided for opening the secondary of one of the transformers, the solenoid being energized in response to conditions under which it is desired that the circuit 1 be interrupted.

Upon opening of the switch 4, the impedance in the branch circuit 1" will be greatly increased, thus causing branch 1' to carry sufficient current to rupture fuse 3 in that branch and, following the rupture of fuse 3 in that branch, the entire current must pass through fuse 3 in branch 1", whereby said fuse will also be ruptured, thus opening the load circuit. While it is desirable, for practical reasons, that all the fuses be of the same capacity, it is only necessary that neither fuse be capable of carrying current of a value higher than the maximum it is desired to permit.

Figure 2 illustrates an alternative to the arrangement of Figure 1 and wherein by reason of the secondary of the transformer 5 being normally open and transformer 6 having no secondary winding, the impedance in each branch is high under normal conditions and blowing of the fuses is brought about by decreasing the impedance in one of the branches by closing switch 4.

A further alternative arrangement is illustrated in Figure 3 in which the secondaries of the series transformers of the two branches are connected in series under normal conditions, and when the solenoid operates in response to the control means selected, one secondary is short-circuited and the other open-circuited by means for the solenoid-actuated switch 7, thus producing the difference in impedance values which results in the rupture of the fuses as described in connection with Figure 1.

I have herein used the word "impedance" in its broad sense as applying to resistance; to reactance; and to combinations of these whereby the divsion of current between parallel circuits is influenced. It is to be understood that I do not intend that the scope of my invention in its broadest aspect be limited to the particular means herein shown for modifying the electrical condition of a circuit section to change the magnitude of current flowing therein or in the section in parallel to it.

Having fully described my invention, what I claim as new and desire to secure by Letters Patent of the United States is:

1. Electrical circuit interrupting means which comprises two circuit sections connected in parallel, each section embodying a fuse and an impedance, and means for varying the impedance of one of the sections, the impedance of said circuit sections being substantially equal under normal conditions.

2. In alternating current distribution system comprising a transformer and a load circuit supplied thereby, means independent of the transformer for interrupting said load circuit, said means comprising two conductor sections connected in parallel in said load circuit, each of said sections embodying a fuse and said sections being adapted to carry under normal conditions a portion of the total load current insufficient to rupture the fuse therein, and means responsive to occurrence of a pre-selected condition in the system to vary the inductance of a section to cause such increase of current in one of the sections as to rupture the fuse therein.

HANS WEICHSEL.